United States Patent
Smith

(10) Patent No.: US 8,364,918 B1
(45) Date of Patent: Jan. 29, 2013

(54) SENSED OPPORTUNISTIC GARBAGE COLLECTION IN MEMORY COMPONENTS

(75) Inventor: Ronald Smith, Phoenix, AZ (US)

(73) Assignee: Marvell International Ltd. (BM)

( * ) Notice: Subject to any disclaimer, the term of this patent is extended or adjusted under 35 U.S.C. 154(b) by 1042 days.

(21) Appl. No.: 12/062,413

(22) Filed: Apr. 3, 2008

Related U.S. Application Data

(60) Provisional application No. 60/910,515, filed on Apr. 6, 2007.

(51) Int. Cl.
  *G06F 12/00* (2006.01)
  *G06F 13/00* (2006.01)
  *G06F 13/28* (2006.01)

(52) U.S. Cl. ........................................ 711/159

(58) Field of Classification Search ............... 711/159
  See application file for complete search history.

(56) References Cited

U.S. PATENT DOCUMENTS

| | | | | |
|---|---|---|---|---|
| 5,682,273 A * | 10/1997 | Hetzler | ........................... | 360/75 |
| 5,802,344 A * | 9/1998 | Menon et al. | ................... | 711/165 |
| 6,615,308 B1 * | 9/2003 | Fanning | ........................ | 711/105 |
| 7,437,557 B2 * | 10/2008 | Lee et al. | ....................... | 713/164 |
| 7,716,425 B1 * | 5/2010 | Uysal et al. | .................... | 711/137 |
| 7,996,642 B1 * | 8/2011 | Smith | ........................... | 711/167 |
| 8,209,503 B1 * | 6/2012 | Smith | ........................... | 711/154 |
| 2003/0229766 A1 * | 12/2003 | Dice et al. | ..................... | 711/154 |
| 2008/0089139 A1 * | 4/2008 | Ong | .......................... | 365/189.08 |
| 2010/0223423 A1 * | 9/2010 | Sinclair et al. | ................ | 711/103 |

* cited by examiner

*Primary Examiner* — Sheng-Jen Tsai

(57) ABSTRACT

A method and system for performing sensed garbage collection in a memory is disclosed. Aspects of the exemplary embodiment include measuring arrival times of read/write commands received from the processor executing an application; determining a periodicity of the read/write commands based on the arrival times; locking onto a phase of the periodicity using the read/write commands to determine predicted arrival times of future read/write commands; creating a real-time schedule of memory requests using the arrival times of the read/write commands and the predicted arrival times of the future read/write commands; using the real-time schedule to sense idle periods where the application will not make a request of the memory, and performing garbage collection during the at least one idle period.

35 Claims, 6 Drawing Sheets

500

SENSED OPPORTUNISTIC GARBAGE COLLECTION IN MEMORY COMPONENTS

CROSS-REFERENCE TO RELATED APPLICATIONS

This application claims the benefit of provisional Patent Application Ser. No. 60/910,515, filed Apr. 6, 2007, assigned to the assignee of the present application, and incorporated herein by reference.

BACKGROUND

Flash memory is one type of non-volatile, rewritable memory commonly used in many types of electronic devices, such as USB drives, digital cameras, mobile phones, and memory cards. Flash memory stores information in an array of memory cells made from floating-gate transistors. In traditional single-level cell (SLC) devices, each cell stores only one bit of information. Some newer flash memory, known as multi-level cell (MLC) devices, can store more than one bit per cell by choosing between multiple levels of electrical charge to apply to the floating gates of its cells.

A NAND memory is accessed by a host system much like a block device such as a hard disk or a memory card. Typically, the host system performs reads and writes to logical block addresses. The NAND memory is divided into blocks and each block is organized into pages or sectors of cells. Blocks may be typically 16 KB in size, while pages may be typically 512 or 2,048 or 4,096 bytes in size. Multi-level NAND cells makes management of NAND devices more difficult, particularly in multithreaded real-time run-time environments.

In response, manufacturers have encapsulated NAND flash as memory devices in which a controller is placed in front of a raw NAND memory. The purpose of the controller is to manage the underlying physical characteristics of the NAND memory and to provide a logical to physical mapping between logical block numbers and physical locations in the NAND memory, which are being accessed by a host system.

Reading and writing are asymmetric behaviors in NAND memories. To read a particular physical block, the address is programmed, and the operation started. After an access time, the data is available. This process of reading blocks can be repeated ad infinitum (ignoring certain NAND disturb phenomenon). Writing blocks is an asymmetric operation because a given block can only be written with data essentially only one time and so is not repeatable like a read.

The initial condition of a NAND cell is to store a logical '1'. To write a data value, wherever there is to be a '0', the data is written and the '1' states are left alone. While it may be possible to continue to overwrite '1' states with '0' states, this is not generally useful. To completely enable the overwriting of a block, the initial condition must be again established. This operation is referred to as an erase cycle.

Using currently available NAND devices as an example, typical read access times are in the range of 25-50 microseconds, write cycle times are in the range of 200-700 microseconds, and erase cycle times are in the range of 2,000-3,000 microseconds. Clearly there is a tremendous variance in performance, depending on the exact circumstances.

In order to mitigate the vast difference between erase and read cycle times, write blocks are grouped together into erase blocks so that the time to erase is amortized over many write blocks, effectively reducing the erase time on a per page basis. In addition, generally more read operations can be performed on a block than erase/write cycle pairs. While there are technological subtleties, generally reads are non-destructive. Because of the nature of the charge storage on the floating gates, erase/write cycle pairs tend to damage the storage cells due to trapped charge in the oxide. For this reason, erase/write cycle pairs should be algorithmically avoided, or when inevitable should be balanced across all blocks. This later mechanism is referred to as "wear leveling".

Because of the impracticality of overwriting data (both because of the wear mechanism and erase block grouping), various techniques are used to virtualize the location of any given logical block. Within the current state of the art is what is called a file translation layer (FTL). This is a driver level software layer which maintains temporary and permanent tables of the mapping between a given logical block number and its physical location in the media. By presenting a logical block device to upper layers of software, any number of file systems may be implemented. Alternatively, a journaling file system may be implemented using the linear array of blocks. Here the blocks are allocated in order of need and the device block allocation is managed as (essentially) a large circular buffer.

As alluded to above, data on NAND devices can be written in a unit of one page, but an erase is performed in the unit of one block. A page can be written only if it is erased, and a block erase will clear the data on its pages. Because a NAND device is write-once, pages are allocated in a block until all the pages in the block are used. Regardless of the specific implementation, obsolete or "overwritten" data in the NAND array is not truly overwritten but simply marked by the number of mechanisms as simply being obsolete or stale. Logically, a block that contains live data is called a valid block, and an "obsolete" block is one that contains obsolete or stale data. If a file is written too many times, for example, it may result in many obsolete blocks in the NAND array.

When all (or nearly all) blocks contain data, blocks that have been written earlier may possibly contain stale data and therefore invalid data. When the NAND device is full or almost full, it becomes necessary to remove the stale data and efficiently pack the remaining valid data to make room in the NAND device. This process is referred to as "garbage collection".

FIG. 1 is a block diagram illustrating a conventional garbage collection on a NAND device. The garbage collection process on a NAND device 10 includes a pre-collection phase 12 and post collection phase 14. During the pre-collection phase 12, all the blocks to be erased, called erase blocks, are examined. Blocks that are stale are available. Blocks that are not stale must be made stale by moving their data, i.e., rewriting the data into a new area. Erase blocks to be erased in a group comprise an erase cluster 16. In this example, the erase cluster 16 includes three valid blocks and one obsolete block 18. The valid blocks are being moved to respective blocks in free cluster 20. For this reason, garbage collection is not done when the NAND device 10 is truly full, but is instead done when the block allocation crosses some threshold determined by file translation management requirements. After all blocks are made stale in the erase cluster 16, the blocks are erased and made available during post collection 14, resulting in free cluster 22. The new beginning of the log 24 is the end of the free cluster 22, and the new end of the log 26 is that last block that was moved.

Because garbage collecting an erase block involves read-then-write operations—first the block must be read to determine its current state and may involve data movement (i.e., writing good data elsewhere to make the current block stale) it can be quite time consuming to perform. The garbage collection time is the sum of the erase time, the summation of the rewritten block and the summation of the other reads necessary to determine the block state. If erase blocks are garbage collected in groups/clusters as shown in FIG. 1, this erase time is yet again increased proportional to the number of blocks being garbage collected.

Because it is not necessarily predictable to an application, operating system (OS) or a file system when a block driver needs to perform garbage collection, any throughput analysis must be able to tolerate a reasonably large asynchronous interruption in performance for the above described garbage collection. This is particularly true because in conventional systems, garbage collection is likely to be delayed until it becomes necessary.

For a single threaded application, such as in a digital still camera, NAND performance can be optimized according to the usage model, and with currently available products in the memory category (e.g. Compact Flash and SD Card) often are. The camera usage model is to: 1) format a flash card; 2) take a picture, writing the data to the card as fast as possible (to minimize click-to-click time); 3) view random pictures to perform edits (e.g. deletion of unwanted pictures); and 4) mass transfer of picture files to another host (such as a desktop or laptop computer). Only steps 2) and 4) have real time performance requirements, and the usage of the storage is highly focused. When writing a new picture to the NAND device, all the NAND device has to do is be able to sustain sufficiently high write bandwidths. Conversely, when the NAND device has to read picture files to transfer to a host, all the NAND device is required to do is sustain sufficiently high read bandwidths.

However, on more complex platforms where there may be multiple streams being read and written to the NAND device, and each stream may have its own characteristics including real-time requirements. Therefore, optimization is not nearly so simple because there are conflicting requirements.

Consider as an example, a multithreaded environment in which two software applications are processing three file streams. One application is recording a real-time media stream (either video or audio) onto the NAND device, while the same application is also playing back either the same or a different media stream. (If it is playing back the same media stream, it is playing back at an earlier time point in the stream.) Assume that the second application is an e-mail client that is receiving e-mail updates over an internet connection and synchronizing the in-box.

In this example, these two applications have different real-time requirements. The media streaming performed by the first application cannot be halted, whereas the e-mail synchronization performed by the second application has no a priori timing requirement. If the media stream write overflows, data will be lost. If the media stream read underflows, there will be annoying gaps in the video or audio playback. If there are delays in the e-mail synchronization, however, the performance will be affected, but since this is demand driven, there is no loss of data.

Typically, media streams are taken from some kind of media source (e.g., over-the-air modem or stored media) at a constant packet rate. These packets may be stored into a ping-pong buffer to make the system resilient to variable latencies in some operations. Media stream data is written into the ping buffer until it is full, then it is written into the pong buffer. When the ping buffer is full, it is read out and passed along to the next stage in the processing pipeline (e.g., the buffer is emptied by software which stores the data onto the NAND device). If the pong buffer is not empty by a consumer by the time the producer is finished loading the ping buffer, there is an overflow situation. If the consumer needs the ping buffer before the ping buffer has been filled, there is an underflow situation.

Large asynchronous garbage collection operations of memory devices may complicate the real-time needs real-time applications, such as in the media stream example. Garbage collection represents a worst case deviation in the typical write access times to memory devices, and this deviation can be extreme when compared to the typical result. The above scheme of using ping/pong buffers can accommodate large and variable latencies only if these latencies are bounded, and these buffers can do so at the expense of becoming very large. This places an additional burden on the platform in that it now requires very large media buffers in order to accommodate an operating condition that is rare.

Memory devices lack an overall context to globally optimize the garbage collection process because memory devices do not have knowledge of the semantics of a given block operation. Accordingly, what would be desirable is a solution which balances the need for NAND management of garbage collection with the needs of applications having different real-time media requirements.

BRIEF SUMMARY

The present invention provides a method and system for performing garbage collection in a memory. Aspects of the exemplary embodiment include measuring arrival times of read/write commands received from the processor executing an application; determining a periodicity of the read/write commands based on the arrival times; locking onto a phase of the periodicity using the read/write commands to determine predicted arrival times of future read/write commands; creating a real-time schedule of memory requests using the arrival times of the read/write commands and the predicted arrival times of the future read/write commands; using the real-time schedule to sense idle periods where the application will not make a request of the memory, and performing garbage collection during the at least one idle period.

According to the method and system disclosed herein, by creating a real-time schedule of memory requests, and allowing the memory to perform opportunistic garbage collection based on idle periods sensed in the real-time schedule, the exemplary embodiments make it no longer necessary for the memory to insert a large asynchronous garbage collection event into the real-time media stream, which may result in a significant reduction in required latency buffers.

DETAILED DESCRIPTION

The present invention relates to sensed opportunistic garbage collection in memory components. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The preferred embodiment provides sensed opportunistic garbage collection in memory components, such as for the managed NAND. The exemplary embodiments will be described in terms of managed NAND components. However, one with ordinary skill in the art will readily recognize that the exemplary embodiments may be used with any type of non-volatile memory management system or device in which garbage collection is necessary, such as any other type of FLASH memory or other types of memories, including phase change memory, for instance. The exemplary embodiments will also be described in the context of particular methods having certain steps. However, the method and system operate effectively for other methods having different and/or additional steps not inconsistent with the exemplary embodiments.

Figure 1:
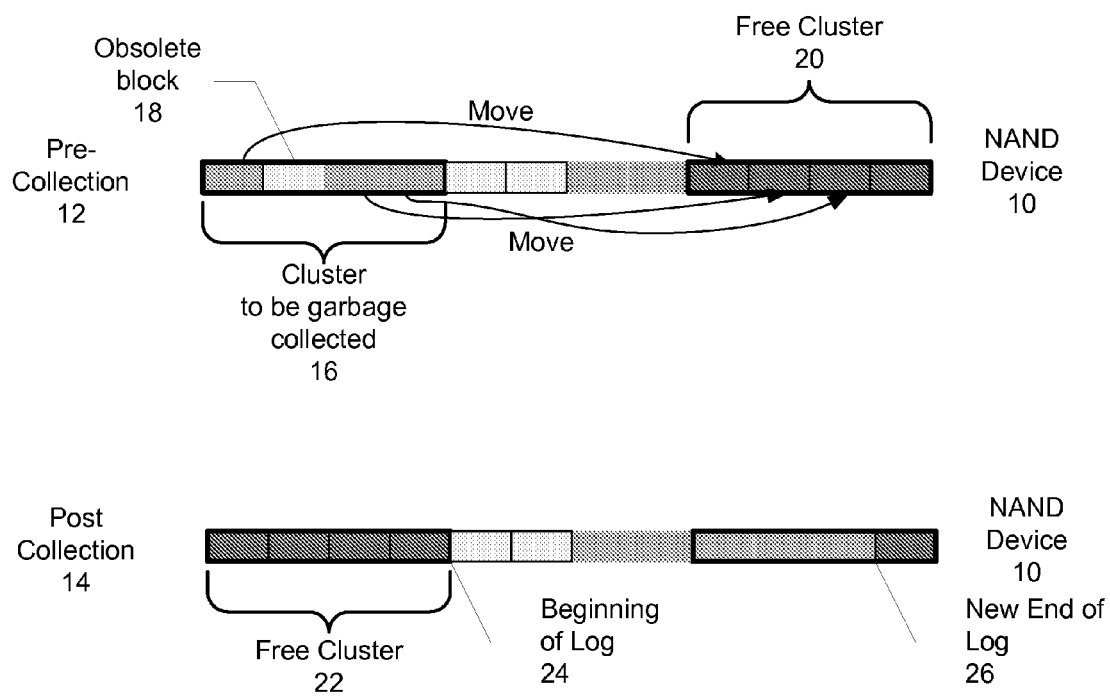
FIG. 1 is a block diagram illustrating a conventional garbage collection on a NAND device.
Figure 2:
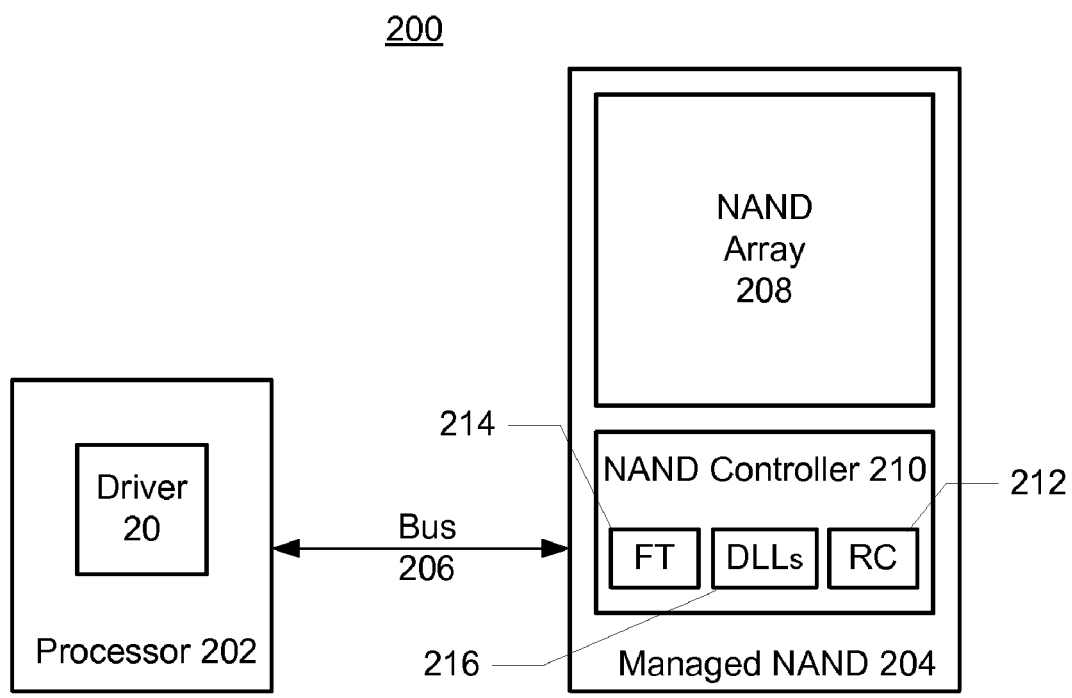
FIG. 2 is a block diagram illustrating an exemplary memory system.

FIG. 2 is a block diagram illustrating an exemplary memory system. The system 200 includes a processor 202 coupled to a managed NAND 204 via a bus interface 206. The processor 202 may be part of a host system that may be any type of electronic device that uses non-volatile memory, such as flash memory, including but not limited to a computer, an embedded device, or a handheld device, such as a cell phone, camera, a media/game player/recorder, a monitor, or a personal digital assistant (PDA), for instance.

The managed NAND 204 includes a NAND array 208 and NAND controller 210 that performs memory management functions for the NAND array 208 as well as having the capability of executing algorithms. According to the exemplary embodiment, the managed NAND 204 is further provided with a real-time clock 212, and algorithms for calculating one or more Fourier transform(s) 214 and multiple digital lock loops (DLLs) 216, which the NAND controller 210 uses for performing sensed opportunistic garbage collection, as described below.

The NAND controller 210 can be any type of memory controller that manages memory access, including but not limited to flash disk controllers or central processing units (CPUs). Through the NAND controller 210, the managed NAND 204 may offer configurable interfaces that make the managed NAND 204 adaptable to different processor and memory types. Example standard interfaces for memory devices include CompactFlash® MultiMediaCard (MMC), Sony Memory Stick®, Secure Digital (SD) card, and the like. The processor interface to the managed NAND 204 may be in the form of a software driver 20 executed by the processor 202 that implements the features required by the NAND interface. The managed NAND 204 can be separate from, or part of, the host system. The processor 202 and the managed NAND 204 may be implemented as individual chips, a chipset, or as a system-on-a-chip (SoC).

The NAND controller 210 performs translation management that maps logical blocks accessed by high-level software from the host system into physical blocks in the NAND array 208. To do so, the NAND controller 210 maintains a logical-to-physical translation map between logical addresses supplied by the processor 202 and a physical list of pages in the NAND array 208. Typically, the NAND controller 210 stores the translation maps as tables in a relatively small amount of volatile storage. When the NAND controller 210 receives a request to read a logical block from the processor 202, the NAND controller 210 looks-up the physical address in the translations maps, retrieves, and returns the requested data. A similar process occurs for a write request, except that the NAND controller 210 allocates new physical blocks to be mapped to the written blocks.

Figure 3:
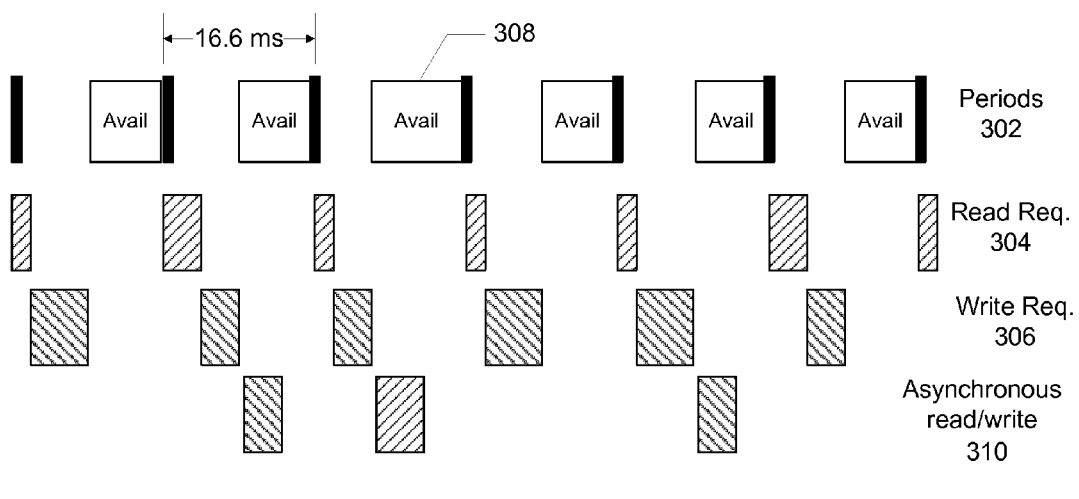
FIG. 3 is a diagram showing a portion of an exemplary schedule of memory request activity for an application that supports real-time media requirements.

FIG. 3 is a diagram showing a portion of an exemplary schedule of memory request activity for an application that supports real-time media requirements. In this example, a schedule of memory request activity 300 is shown for an application that supports a video stream at 30 frames per second (fps). The schedule shows that at 30 fps, the video stream has 16.6 ms periods 302, during which, read and write requests 304 and 306 to read/write logical blocks are made to the managed NAND 204 via the processor 202. After the read and write requests 304 and 306 are made, there is a time gap 308 left available in each period 302. Other memory activity may include asynchronous read/write requests 310 of the managed NAND 204 from asynchronous thread activity (such as from an e-mail client).

Referring to both FIGS. 2 and 3, the read and write requests 304 and 306 are sent as commands over bus 206 from the processor 202 to the NAND controller 210. The format typically includes a command, an address, and an optional data packet, where the command indicates whether to read or write; the address is the address of the logical block on which the command is being performed; and in the case of a write command, the data packet is the data to be written. Once the NAND controller 210 receives the commands, the NAND controller 210 translates the commands into memory access requests for the NAND array 208.

In response to write requests, the managed NAND 204 is managed by adding new allocation blocks instead of overwriting old allocation blocks, which eventually consumes all available blocks in the NAND array 208. Thus, at some point, garbage collection will need to be performed to reclaim storage allocated to stale or obsolete data, which can be time consuming. Garbage collection is time-consuming because garbage collection requires a reanalysis of the logical-to-physical translations, and the erase cycle time is the longest cycle time of any of the operations of the NAND.

In some memories, garbage collection can be as long as hundreds of milliseconds. Such a latent seat window may not be objectionable for an application, such as an e-mail client checking e-mail, but for a real-time application such as video, such latency would create an unacceptable application environment. One way to solve this problem would be to incorporate very large offers to compensate for this large latency. The problem here is that the NAND controller in a conventional memory still would have no context into which to make its decisions. The algorithms in the NAND controller are based just on what it sees, which are requests for logical blocks from the host system. Thus, conventional memories lack an overall context to globally optimize behavior because they lacked knowledge of the semantics of a given block operation.

Accordingly, the exemplary embodiment provides a method and system for performing sensed opportunistic garbage collection in memory components, such as the memory system 200. The exemplary embodiment provides a globally optimized solution that allows the NAND controller 210 to manage garbage collection (which can be moved in time) around one or more real-time media streams (which cannot be moved in time), thereby balancing the need for management of garbage collection with the needs of applications having different real-time media requirements.

The exemplary embodiment takes advantage of the fact that the managed NAND 204 is attached directly to the processor 202, and the processor 202 through a file system (not shown) and the driver 20 have knowledge of the current application environment of the host system. For example, the processor 202 may know that an e-mail client is running while a media recorder is concurrently recording a data stream and playing back the data stream, for instance. The NAND controller 210 uses the read/write commands transmitted by these applications from the processor 202 to sense the context of the current application environment of the host system so as to predict when to take advantage of managed NAND request idle times to globally optimize behavior, such as updating translations and performing garbage collection cycles, for example. According to the exemplary embodiment, storage performance is globally optimized by the managed NAND 204 creating a periodic time structure or real-time schedule showing when executing applications will have memory idle times. The managed NAND 204 divides garbage collection into atomic operations (read/write/erase) and performs those garbage collection atomic operations that can be done in the idle periods indicated in the real-time schedule so that garbage collection does not need to wait until the NAND array 208 is full.

Figure 4:
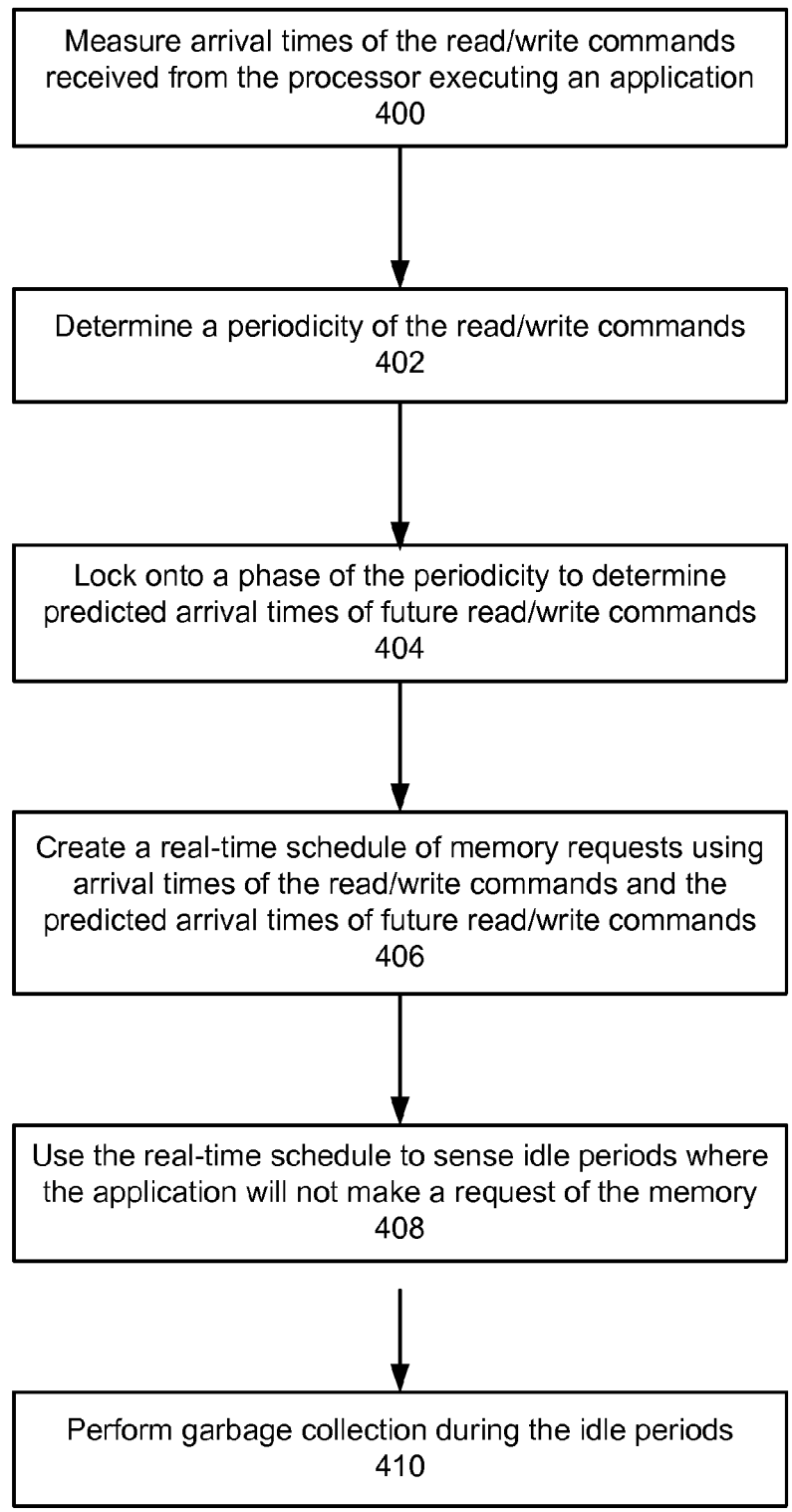
FIG. 4 is a flow diagram illustrating a process for performing garbage collection in memory components, such as the managed NAND, in accordance with an exemplary embodiment.

FIG. 4 is a flow diagram illustrating a process for performing garbage collection in memory components, such as the managed NAND 204, in accordance with an exemplary embodiment. The process may begin by the managed NAND 204 measuring arrival times of the read/write commands received from the processor 202 executing an application (block 400). According to one embodiment, the NAND controller 210 uses the real-time clock 212 (FIG. 2) to measure a set of arrival times for the read commands and a set of arrival times for the write commands associated with the application. In one embodiment, the real-time clock 212 need only keep track of a relative time of day, absolute time is not necessary.

Referring still to FIG. 4, according to the exemplary embodiment, the NAND controller 210 determines a periodicity of the read/write commands (block 402). According to one exemplary embodiment, the NAND controller 210 may determine the periodicity of the read/write commands by calculating a Fourier transform 214 (FIG. 2) on the arrival times. The Fourier transform 214 is used to transform the arrival times from a time domain to a frequency domain. The periodicity for the read commands may be determined based on the set of arrival times for the read commands, and the periodicity for the write commands may be determined based on the set of arrival times for the write commands. In one embodiment, the NAND controller 210 records a set of arrival times when each type of command (e.g., read and write) is received from the processor 202 for each application and performs a Fourier transform 214 on each set of arrival times.

After calculating the periodicity, the NAND controller 210 may determine whether the periodicity is associated with a known type of media stream. Referring to FIG. 3, the exemplary embodiment takes advantage of the fact that a repeating pattern develops around the times the read/write commands occur during real-time media. By examining the times at which the read/write commands occur, i.e., the arrival times, the NAND controller 210 can make a determination of whether a sequence of read/write commands are operations used to process a real-time media stream based on whether there is a repeating pattern to the read/write commands. If the read/write commands are examined in the frequency domain instead of the time domain, it can be concluded that there is a repeating pattern due to a sharp spike at the video frame rate of 16.6 ms (i.e., 30 Hz). This sharp spike stands out with respect to the other "random" frequencies that originate from the asynchronous operations, e.g., asynchronous read/write 310.

In the frequency domain, sharply defined spikes may be found, particularly around known or standard video and audio frame rates. Video frame rates are not necessarily infinitely flexible, instead video frame rates based on various protocols and codecs have a short list of likely frame rates. The same will be true for audio data. Between a list of industry standard frame rates, pronounced spikes in the frequency domain, it will be possible to identify the type of media steam the read/write operations were performed on with high accuracy. According to the exemplary embodiment, this is accomplished by comparing each periodicity calculated by the Fourier transform to a table of known media frequencies. If the periodicity is found in the table, then the periodicity of the read/write commands can be identified as operations likely performed on the corresponding type of media stream in the table. In one embodiment, unless the periodicity of the read/write commands is determined to be associated with a known type of media stream, processing ceases. Otherwise, processing may continue, as below.

Referring again to FIG. 4, the NAND controller 210 locks onto a phase of the periodicity using the read/write commands to determine predicted arrival times of future read/write commands (block 404). In one exemplary embodiment, the NAND controller 210 inputs the read/write commands to a digital lock loop to lock onto a phase of the periodicity. As well known in the art, a digital lock loop (DLL) is a discrete time version of a phase lock loop. In one embodiment, because there can be different media streams (for different applications as well as read and write command streams) each identified command type (read or write) and its periodicity is assigned a digital lock loop, resulting in multiple digital lock loops. For example, the read commands may be input to one digital lock loop to attempt to lock onto the phase of the periodicity of the read commands, and the write commands may be input to a second digital lock loop to attempt to lock onto the phase of the periodicity of the write commands.

In the example shown in FIG. 3, assuming there is a stream of read commands arriving at 30 Hz and a stream of write commands arriving a 30 Hz, then two digital lock loop s will be assigned, one for each pair of operations. The periodicity (e.g., 30 Hz) input to each digital lock loop is used to set a phase timer in the digital lock loop. If the next observed arrival time is early, the phase is increased by setting the phase timer to 31 Hz, for example. If the next observed arrival time is late, the phase is decreased by setting the phase timer to 29 Hz, for example. By locking onto the phase of the periodicity of the read and write commands, the digital lock loops can be used to predict arrival times of future read and write commands.

The NAND controller 210 to creates a real-time schedule of memory requests using arrival times of the read/write commands and the predicted arrival times of future read/write commands (block 406). The NAND controller 210 then uses the real-time schedule to sense idle periods where the application will not make a request of the memory (block 408). In one embodiment, the expected read/write cycle times of the managed NAND 204 may be used to sense idle periods to determine the length of time to complete each read/write operation in the real-time schedule. In one embodiment, the NAND controller 210 performs garbage collection during the idle periods (block 410), rather than having to wait until the NAND array 208 is substantially full.

In another embodiment, the NAND controller 210 can use the real-time schedule to predict future media read and write request, and in response can prepare to receive that particular request. Once a media stream is detected, the NAND controller 210 can bias the translation cache algorithm to accelerate that particular media stream.

In a further embodiment, when performing sensed opportunistic garbage collection, the NAND controller 210 can be configured to use two thresholds, a period threshold, and a phase threshold. The period threshold can be set to allow for jitter in the arrival times of the read/write commands during the calculation of the periodicity, such that read/write commands having arrival times within the period threshold are considered to be in the observed period. An example period threshold may be 1-2 hertz, for example, so that a read/write command arriving at 29 Hz is considered to be within the 30 Hz period.

The phase threshold can be set to allow for jitter in the arrival times of the read/write commands while the DLL 216 is attempting a phase lock, such that read/write commands having arrival times within the phase threshold are considered to be in the observed phase. An example phase threshold may be 1-2 hertz for example so that a read/write command arriving at 29 Hz is considered to meet the 30 Hz phase.

Figure 5:
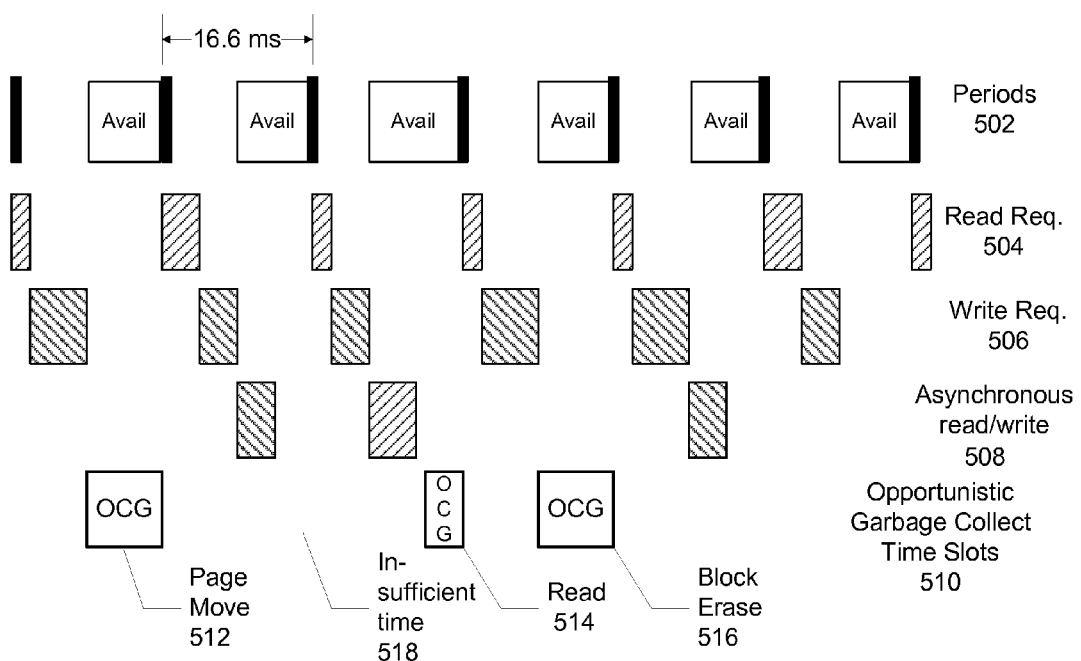
FIG. 5 is a diagram illustrating a portion of an exemplary real-time schedule for a managed NAND that takes into account activity of an application that supports real-time media requirements, such as a video stream.

FIG. 5 is a diagram illustrating a portion of an exemplary real-time schedule for a managed NAND 204 that takes into account activity of an application that supports real-time media requirements, such as a video stream. The real-time schedule 500 includes time periods 502 (e.g., 16.6 ms in length) during which an application may make read request 504 and write request 506 of the managed NAND 204 for processing the real-time media stream, which are received as read and write commands. The application's read and write requests 504 and 506 for the real-time media have priority and are processed first.

According to the exemplary embodiment, a time gap is left over in each period 502 during which at least one of two additional items may be scheduled. First, asynchronous read/write requests 508 of the managed NAND 204 from asynchronous thread activity (such as from an e-mail client) may be scheduled that take priority.

Second, opportunistic garbage collection (OGC) time slots 510 may be scheduled to indicate idle periods when no read or write requests associated with the application or a media stream will be made of the managed NAND 204. Each OGC timeslot 510 minimally indicates the time duration of the idle period. According to the exemplary embodiment, the real-time schedule 500 for the managed NAND 204 needs to be designed to take into account the needs of the real-time media stream as well as the expected performance of the memory. That is, in one embodiment, the minimum time duration for the idle periods of the OGC timeslots 510 in the real-time schedule 500 may be greater than the minimum time necessary for the memory to perform a block erase. For example, since it takes up to 3 milliseconds to erase a block, the minimum time duration for the idle periods of the OGC timeslots 510 in the real-time schedule 500 must be greater than 3 milliseconds or the first time the memory needs to erase a block, the real-time schedule 500 may overflow.

Figure 6:
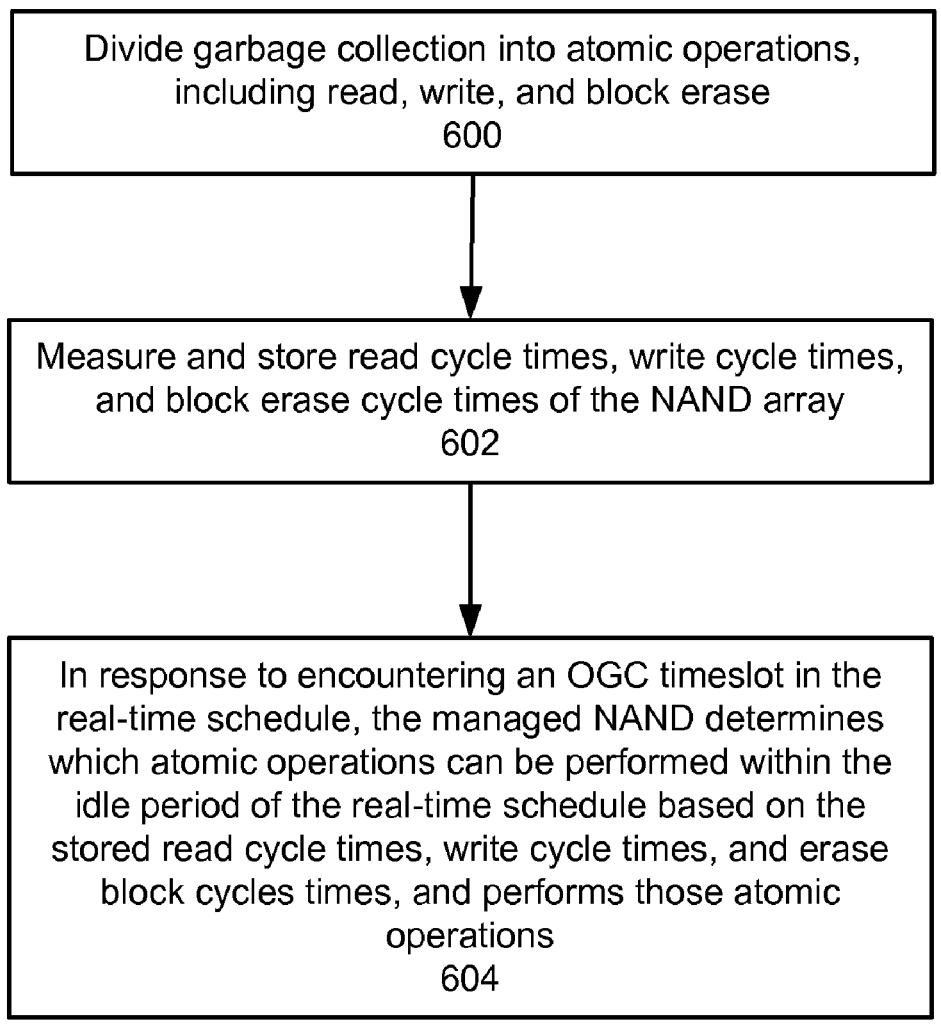
FIG. 6 is a flow diagram illustrating the process for performing sensed garbage collection based on opportunistic garbage collection (OGC) timeslots in accordance with one exemplary embodiment.

FIG. 6 is a flow diagram illustrating the process for performing sensed garbage collection based on OGC timeslots in accordance with one exemplary embodiment. The process may begin with the NAND controller 210 dividing garbage collection into atomic operations, including read, write, and block erase (block 600). In one embodiment, the garbage collection in the managed NAND 204 is divided into two primary phases: move and erase, where the move phase is the movement of current data to make an erase block completely stale; and the erase phase is the erasure of the erase block via a block erase. In one embodiment, the erase phase is further divided into read and write cycles. The move and erase phases may be further divided into sub-operations that go into the two steps that affect maintenance of the translation tables as well as handling wear leveling and power fail.

Thereafter, during operation of the managed NAND 204, the read/write cycle times and block erase cycle times of the NAND array 208, which correspond to the garbage collection atomic operations, are measured and stored for tracking (block 602). Using currently available NAND devices as an example, typical read cycle times are in the range of 25 to 50 microseconds, typical write cycle times are in the range of 200 to 700 microseconds, and block erase cycle times are in the range of 2,000 to 3,000 microseconds.

Depending on the type of memory involved, the type of read and write cycle times that may be measured and stored may include page read and page write cycle times, or block read and block write cycle times, or both. In one embodiment, the read cycle times, write cycle times, and block erase cycle times are stored by NAND controller 210.

In response to encountering an OGC timeslot 510 in the real-time schedule 500, the managed NAND 204 determines which ones of the atomic operations can be performed within the idle periods of the real-time schedule based on the stored read cycle times, write cycle times, and erase block cycles times, and performs those atomic operations (block 604). Each OGC timeslot 510 includes an argument for conveying the time duration of the idle period, i.e., the amount of time left in the current time slot in which garbage collection can be done. In one embodiment, the NAND controller 210 compares the stored read cycle times, write cycle times, and block erase cycle times with the time duration of the OGC time slot 510 to determine which ones of the atomic operations can be performed within the given time duration. The managed NAND 204 now has knowledge of how long it takes to perform each task during OGC, and for how long the application (s) executing on the processor 202 will not make memory requests. From this knowledge, the managed NAND 204 can determine which OGC task to perform. For example, if an OGC timeslot 510 indicates that the idle time duration is 1 ms, the managed NAND 204 may determine that there is enough time to read or write a page during OGC, but not enough time to erase a block, which may take 3 ms, for example.

FIG. 5 shows example OGC atomic operations that could be performed in the available times during the issued OGC timeslots 510. Examples shown include a page move 512, a read 514, and a block erase 516. Also shown is an insufficient time 518 in the schedule 500 to issue an OGC atomic operation.

According to the exemplary embodiments, if the managed NAND 204 has a block to garbage collect and there is sufficient idle time to fully implement only one or more atomic operations, these atomic operations are performed, but by iteratively performing a sufficient number of atomic operations, the block is completely collected.

For example, when receiving the OGC timeslot 510, the managed NAND 204 may begin to look up erase blocks to garbage collect according to an internally executed algorithm, but will also take into account that there is only the specific time duration of one or more idle periods to spend on the activity. If the memory received an OGC timeslot 510 indicating an idle period of 5 milliseconds, for instance, then the memory may locate pages to move, and move approximately 5 of the pages. The computation time, the page read access and the write cycle time (using parameters typical of current NANDs) would allow the memory to only move these 5 pages. This would be repeated until enough pages had been moved to make the entire erase block stale. Finally a 3 millisecond erase cycle would fit in the allotted OGC time of 5 milliseconds, and an erase block would be reclaimed.

Conventionally, garbage collection is performed when a volume reaches a certain percentage of fullness, such as a 90% volume full threshold, for example. According to a further aspect of the exemplary embodiment, an OGC threshold is provided that is less than the normal garbage collection threshold that is used to trigger issuance of the OGC atomic operations. Preferably, this second threshold is programmable with a configuration command, but as one example, may be set at approximately 80% of volume full. Thus, in this embodiment, the processor 202 would not issue an OGC atomic operation until the managed NAND 204 reaches 80% full.

By apportioning specific OGC time slots 510 and by having a lower threshold applied to this opportunistic garbage collection, the exemplary embodiments make it no longer necessary for the managed NAND 204 to insert a large asynchronous garbage collection event into the real-time media stream, which may result in a significant reduction in required latency buffers.

A method and system for sensed opportunistic garbage collection for memory components has been disclosed. The present invention has been described in accordance with the embodiments shown, and one of ordinary skill in the art will readily recognize that there could be variations to the embodiments, and any variations would be within the spirit and scope of the present invention. For example, the present invention can be implemented using hardware, software, a computer readable medium containing program instructions, or a combination thereof. Software written according to the present invention is stored in some form of computer-readable medium such as memory or CD-ROM, and is to be executed by a processor. Accordingly, many modifications may be made by one of ordinary skill in the art without departing from the spirit and scope of the appended claims.

I claim:

1. A method for performing garbage collection in a memory, comprising:
   measuring arrival times of read/write commands received from a processor executing an application;
   determining a periodicity of the read/write commands by transforming the arrival times from a time domain to frequency domain data and identifying a type of media that the read/write commands are performed on based at least in part on the frequency domain data;
   locking onto a phase of the periodicity using the read/write commands to determine predicted arrival times of future read/write commands;
   creating a real-time schedule of memory requests using the arrival times of the read/write commands and the predicted arrival times of the future read/write commands;
   using the real-time schedule to sense idle periods where the application will not make a request of the memory; and
   performing garbage collection in the memory during the idle periods.

2. The method of claim 1 wherein the measuring further comprises measuring a first set of arrival times for read commands and a second set of arrival times for write commands.

3. The method of claim 2 wherein the determining further comprises determining a first periodicity of the read commands based on the first set of arrival times for the read commands, and determining a second periodicity of the write commands based on the second set of arrival times for the write commands.

4. The method of claim 3 wherein the determining is performed using a Fourier transform.

5. The method of claim 3 wherein the determining a periodicity further comprises determining whether the first periodicity and the second periodicity are associated with a known type of media stream.

6. The method of claim 5 further comprising comparing the first periodicity and the second periodicity to a table of known media frequencies.

7. The method of claim 5 wherein the locking further comprises locking onto a first phase of the first periodicity of the read commands, and locking onto a second phase of the second periodicity of the write commands.

8. The method of claim 7 wherein the locking is performed with a digital lock loop.

9. The method of claim 1 wherein identifying the type of media further comprises comparing the frequency domain data to known frequencies corresponding to known media types.

10. The method of claim 1 further comprising:
    dividing garbage collection into atomic operations, including read, write, and block erase;
    measuring and storing read cycle times, write cycle times, and block erase cycle times of the memory;
    determining which ones of the atomic operations can be performed within the idle periods of the real-time schedule based on the stored read cycle times, write cycle times, and erase block cycles times, and performing those atomic operations.

11. The method of claim 10 wherein each of the idle periods comprises an opportunistic garbage collection (OGC) time slot that indicates when no read request or write requests associated with at least one of the application or a media stream will be made of the memory.

12. A non-transitory computer-readable medium that stores executable program instructions for performing sensed garbage collection in a memory that when executed by at least a memory controller cause the memory controller to perform a method comprising:
    measuring arrival times of read commands and write commands received by the memory from a processor executing an application;
    determining a first periodicity of the read commands and a second periodicity of the write commands by transforming the arrival times from a time domain to frequency domain data;
    identifying, based at least in part on the frequency domain data, a first type of media that the read commands are performed on and a second type of media that the write commands are performed on;
    locking onto a phase of the first periodicity of the read commands and locking onto a phase of the second periodicity of the write commands to determine predicted arrival times of future read/write commands associated with the identified first type of media and the second type of media;

creating a real-time schedule of memory requests using the arrival times of the read/write commands and the predicted arrival times of the future read/write commands;

using the real-time schedule to sense idle periods where the application will not make a request of the memory; and performing garbage collection in the memory during the idle periods.

13. The non-transitory computer-readable medium of claim 12 further comprising program instructions for measuring a first set of arrival times for the read commands and a second set of arrival times for the write commands.

14. The non-transitory computer-readable medium of claim 13 wherein the program instructions for determining further comprise determining the first periodicity of the read commands based on the first set of arrival times for the read commands, and determining the second periodicity of the write commands based on the second set of arrival times for the write commands.

15. The non-transitory computer-readable medium of claim 12 wherein transforming the arrival times from the time domain to the frequency domain data is performed using a Fourier transform.

16. The non-transitory computer-readable medium of claim 12 wherein the program instructions for identifying the first type of media and the second type of media comprises determining whether the first periodicity and the second periodicity are associated with a known type of media stream.

17. The non-transitory computer-readable medium of claim 12 wherein the program instructions for identifying the first type of media and the second type of media further comprising program instructions for comparing the first periodicity and the second periodicity to a table of known media frequencies.

18. The non-transitory computer-readable medium of claim 12 wherein the program instructions for locking further comprise locking onto a first phase of the first periodicity of the read commands, and locking onto a second phase of the second periodicity of the write commands.

19. The non-transitory computer-readable medium of claim 12 wherein the locking is performed with a digital lock loop.

20. The non-transitory computer-readable medium of claim 12 further comprising program instructions for using the real-time schedule for biasing a translation cache algorithm.

21. The non-transitory computer-readable medium of claim 12 further comprising program instructions for:
   dividing garbage collection into atomic operations, including read, write, and block erase;
   measuring and storing read cycle times, write cycle times, and block erase cycle times of the memory;
   determining which ones of the atomic operations can be performed within the idle periods of the real-time schedule based on the stored read cycle times, write cycle times, and erase block cycles times, and performing those atomic operations.

22. The non-transitory computer-readable medium of claim 21 wherein each of the idle periods comprises an opportunistic garbage collection (OGC) time slot that indicates when no read request or write requests associated with at least one of the application or a media stream will be made of the memory.

23. A memory system, comprising:
   a bus;
   a processor;
   a memory coupled to the processor via the bus, the memory including a memory array and a memory controller that is configured to perform memory management functions for the memory array, including;
      measuring arrival times of read commands and write commands received from the processor executing an application;
      determining a first periodicity of the read commands and a second periodicity of the write commands by transforming the arrival times from a time domain to a frequency domain;
      identifying, based at least in part on data from the frequency domain, a first type of media that the read commands are performed on and a second type of media that the write commands are performed on;
      locking onto a phase of the first periodicity of the read commands and locking onto a phase of the second periodicity of the write commands to determine predicted arrival times of future read/write commands associated with the identified first type of media and the second type of media;
   creating a real-time schedule of memory requests using the arrival times of the read commands and the write commands and the predicted arrival times of the future read/write commands;
   using the real-time schedule to sense idle periods where the application will not make a request of the memory; and
   performing garbage collection in the memory during the idle periods.

24. The memory system of claim 23 further comprising a real-time clock to measure a first set of arrival times for the read commands and a second set of arrival times for the write commands.

25. The memory system of claim 24 wherein the memory controller is configured to determine the first periodicity of the read commands based on the first set of arrival times for the read commands, and determines the second periodicity of the write commands based on the second set of arrival times for the write commands.

26. The memory system of claim 23 wherein the memory controller is configured to determine the first periodicity and the second periodicity with a Fourier transform that transforms the arrival times from the time domain to the frequency domain.

27. The memory system of claim 23 wherein the memory controller is configured to determine whether the first periodicity and the second periodicity are associated with a known type of media stream.

28. The memory system of claim 23 wherein the memory controller is configured to compare the first periodicity and the second periodicity to a table of known media frequencies to identify the first type of media and the second type of media.

29. The memory system of claim 23 wherein the memory controller is configured to lock onto a first phase of the first periodicity of the read commands, and lock onto a second phase of the second periodicity of the write commands.

30. The memory system of claim of claim 29 wherein the memory controller is configured to lock onto the first phase and the second phase with a digital lock loop.

31. The memory system of claim 23 wherein the memory controller is configured to bias a translation cache algorithm using the real time schedule.

32. The memory system of claim 23 wherein the memory controller is configured to perform performs further functions including:

dividing garbage collection into atomic operations, including read, write, and block erase;
measuring and storing read cycle times, write cycle times, and block erase cycle times of the memory;
determining which ones of the atomic operations can be performed within the idle periods of the real-time schedule based on the stored read cycle times, write cycle times, and erase block cycles times, and performing those atomic operations.

33. The memory system of claim 32 wherein each of the idle periods comprises an opportunistic garbage collection (OGC) time slot that indicates when no read request or write requests associated with at least one of the application or a media stream will be made of the memory.

34. The memory system of claim 23 wherein the memory comprises a managed NAND having a NAND array and a NAND controller.

35. A method for performing sensed opportunistic garbage collection in a memory, comprising:
receiving read commands and write commands from a processor executing an application, and using a real-time clock to measure a first set of arrival times for the read commands and a second set of arrival times for the write commands;
transforming the first set of arrival times for the read commands and the second set of arrival times for the write commands from a time domain to a frequency domain;
determining a first periodicity of the read commands based on the transformed first set of arrival times for the read commands, and determining a second periodicity of the write commands based on the transformed second set of arrival times for the write commands;
identifying a first type of media that the read commands are performed on and identifying a second type of media that the write commands are performed on by determining whether the first periodicity and the second periodicity are associated with a known type of media stream;
in response to determining that the first periodicity and the second periodicity are associated with the known type of media stream:
locking onto a first phase of the first periodicity of the read commands to determine a first set of predicted arrival times of future read commands, and locking onto a second phase of the second periodicity of the write commands to determine a second set of predicted arrival times of future write commands;
creating a real-time schedule of memory requests using the first set of arrival times, the second set of arrival times, the first set of predicted arrival times, and the second set of predicted arrival times;
using the real-time schedule to sense idle periods where the application will not make a request of the memory; and
performing garbage collection in the memory during the idle periods.

* * * * *